United States Patent [19]

Zaffina

[11] Patent Number: 5,337,892
[45] Date of Patent: Aug. 16, 1994

[54] TACKLE BOX AND ASSEMBLY

[76] Inventor: Eugene J. Zaffina, 3663 Rawhide St., Las Vegas, Nev. 89120

[21] Appl. No.: 24,615

[22] Filed: Mar. 1, 1993

[51] Int. Cl.$^5$ .............................................. B65D 85/00
[52] U.S. Cl. ................................. 206/315.11; 43/54.1
[58] Field of Search ................ 206/514, 315.11, 372, 206/373; 43/54.1

[56] References Cited

U.S. PATENT DOCUMENTS

| | | | |
|---|---|---|---|
| 1,896,827 | 2/1933 | Neely | 43/54.1 X |
| 2,604,372 | 7/1952 | Klinglesmith | 43/54.1 X |
| 2,717,470 | 9/1955 | Holdeman | 206/315.11 X |
| 2,734,306 | 2/1956 | Holdeman | 206/315.11 X |
| 2,765,576 | 10/1956 | Kurek | 43/54.1 X |
| 3,378,134 | 4/1968 | Wilkinson et al. | 43/54.1 X |
| 3,947,991 | 4/1976 | Morcom | 43/54.1 |
| 4,505,386 | 3/1985 | Abrahamson | 206/315.11 |
| 4,759,148 | 7/1988 | Love | 43/54.1 |
| 5,062,540 | 11/1991 | Jenkins | 220/23.83 |

Primary Examiner—Paul T. Sewell
Assistant Examiner—Beth Anne C. Cicconi
Attorney, Agent, or Firm—Thomas A. Turner, Jr.

[57] ABSTRACT

A tackle box having rotating tray compartments mounted about a center post and adapted to close and to fit within the circular top opening of a bucket, has a lifting ring on the center post for selectively removing the tackle box and has a sliding lid for selectively opening and closing the tackle box to provide access to the tray compartments.

6 Claims, 3 Drawing Sheets

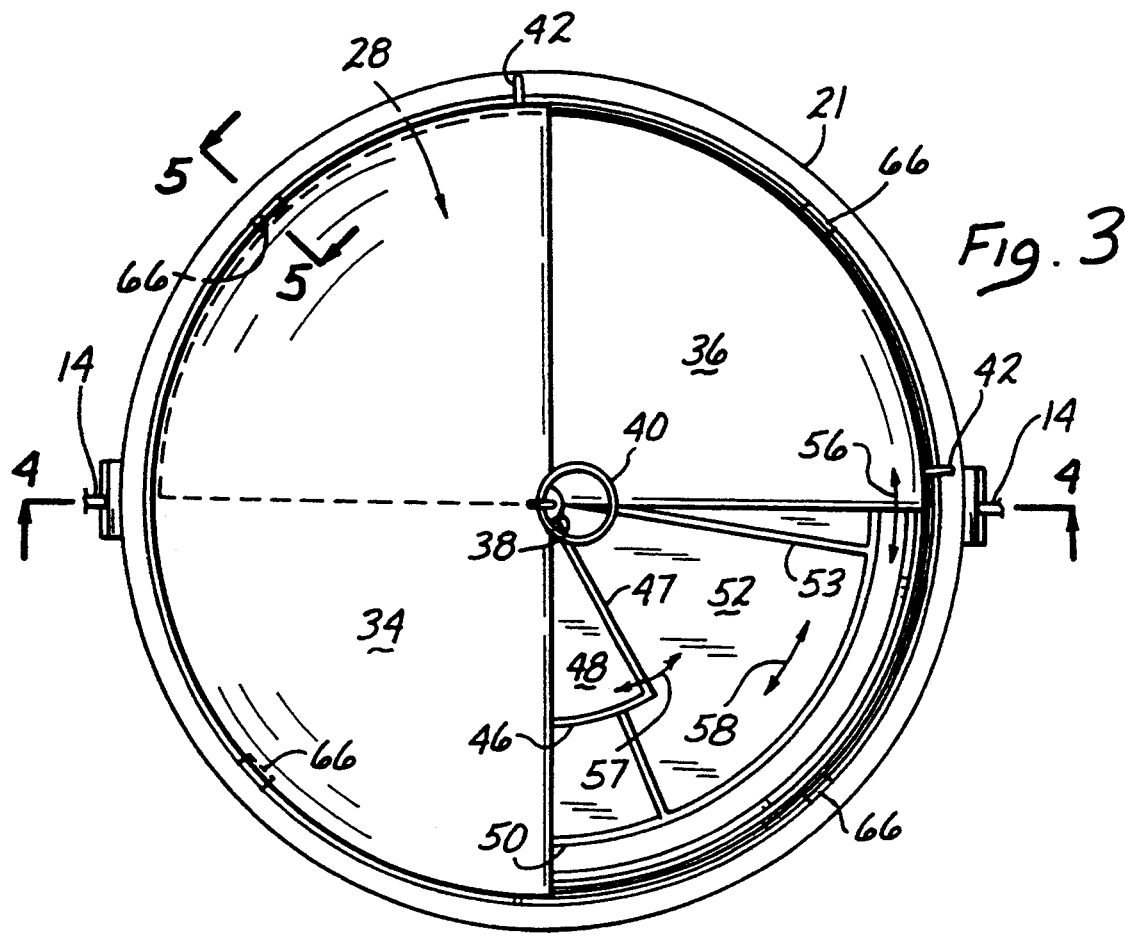
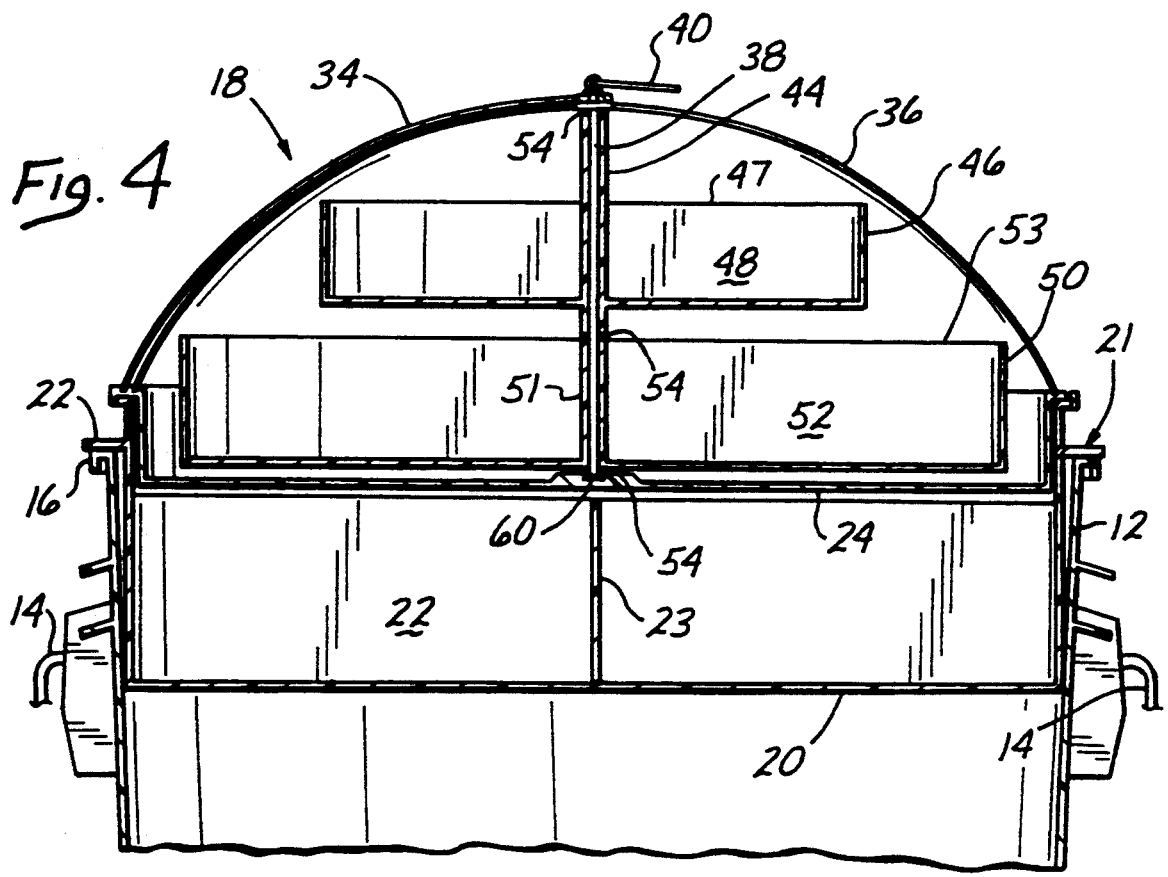

TACKLE BOX AND ASSEMBLY

BACKGROUND OF THE INVENTION

1. Field of the Invention:

The present invention relates to the art of fishing tackle boxes, and more particularly to the art of tackle boxes adapted for integration with other containers.

2. Description of the Prior Art:

In the past, tackle boxes have been used by fishermen to sort and keep fishing tackle and like fishing implements used in fishing. Such boxes typically have compartments within them for sorting various implements separately. Typically, such boxes have a lid or covering which can be closed for storage of the implements, and opened when access is desired to the interior compartments. The compartments sometimes can be moved within the box to provide access to additional compartments below. Such boxes are generally self-contained.

Many fishermen take with them when they fish additional containers to carry additional equipment to aid them in their endeavors. A typical additional container is a buckets for carrying fish back and for carrying food to the fishing location. Fishing pole covers and additional clothing are often also included. Not infrequently, ideal fishing locations are sought in remote locations inaccessible to motor transportation, and substantial hiking is required by the fishermen. Such additional equipment presents a load problem which is especially difficult when the remote location can be reached only by strenuous hiking through thickly grown flora and difficult terrain, and when the location is some distance away.

It is desired to provide fishing tackle boxes which reduce the number of items which a fisherman must carry while still providing space for all of the tackle and like implements fishermen desire to have when fishing. It is further desired to provide a fishing tackle container which increases the number of compartmented space while reducing the number of items required to be carried. It is yet further desired to provide a fishing tackle container which provides an opening arrangement that results in ready access to each compartment directly from a position vertically directly above the compartment.

SUMMARY

In brief, in accordance with one aspect of the present invention, a generally semi-spherically shaped tackle box is described for fitting within the opening of a bucket having a typical circular top. The tackle box comprises a tray adapted for sitting within the circular opening of the bucket, which tray has a center post extending to the outside of the tackle box assembly and adapted for being gripped by a user. Circular trays are mounted to rotatable sleeves mounted on the center post, the trays having compartments for sorting tackle and like implements.

An outside shell or lid, generally semi-spherical in shape and adapted to fit within the swing of a handle attached to the bucket, has a sliding portion adapted to slide within the stationery portion of the lid to provide an opening to the interior of the tackle box. The compartments of the rotatable tray can be moved into position to be accessed through the provided opening of the tackle box, by rotating the tray about the center post. Access to each of the compartments is achieved vertically through the opened lid by selective rotational movement of the lid.

In alternative embodiments, a plurality of trays can be rotatably mounted on the center post. Access to trays mounted below other trays on the post can be accessed by deleting compartments in the trays mounted above the tray on the center post. In yet another embodiment, additional trays can be made available by positioning the additional tray or trays as part of the tackle box assembly between the bucket's opening and the rotatable trays having compartments. The additional trays may also have compartments.

These and other novel aspects of the present invention, together with other aspects thereof, can be better understood by the following detailed description of the preferred embodiments, which are designed to be read in conjunction and together with the accompanying drawings.

BRIEF DESCRIPTION OF THE DRAWINGS

FIG. 3 is plan view of the preferred embodiment of the present invention of FIG. 1, having the top partially opened for ease in understanding;

FIG. 4 is a side elevational, cross-sectional view of the preferred embodiment of the present invention of FIG. 1 taken along line 4—4 of FIG. 3; and, FIG. 5 is a side elevational, cross-sectional view of the lips and connecting flanges of the preferred embodiment of FIG. 1 of the present invention, taken along line 5—5 of FIG. 3.

DETAILED DESCRIPTION OF THE PREFERRED EMBODIMENTS

Figure 1:
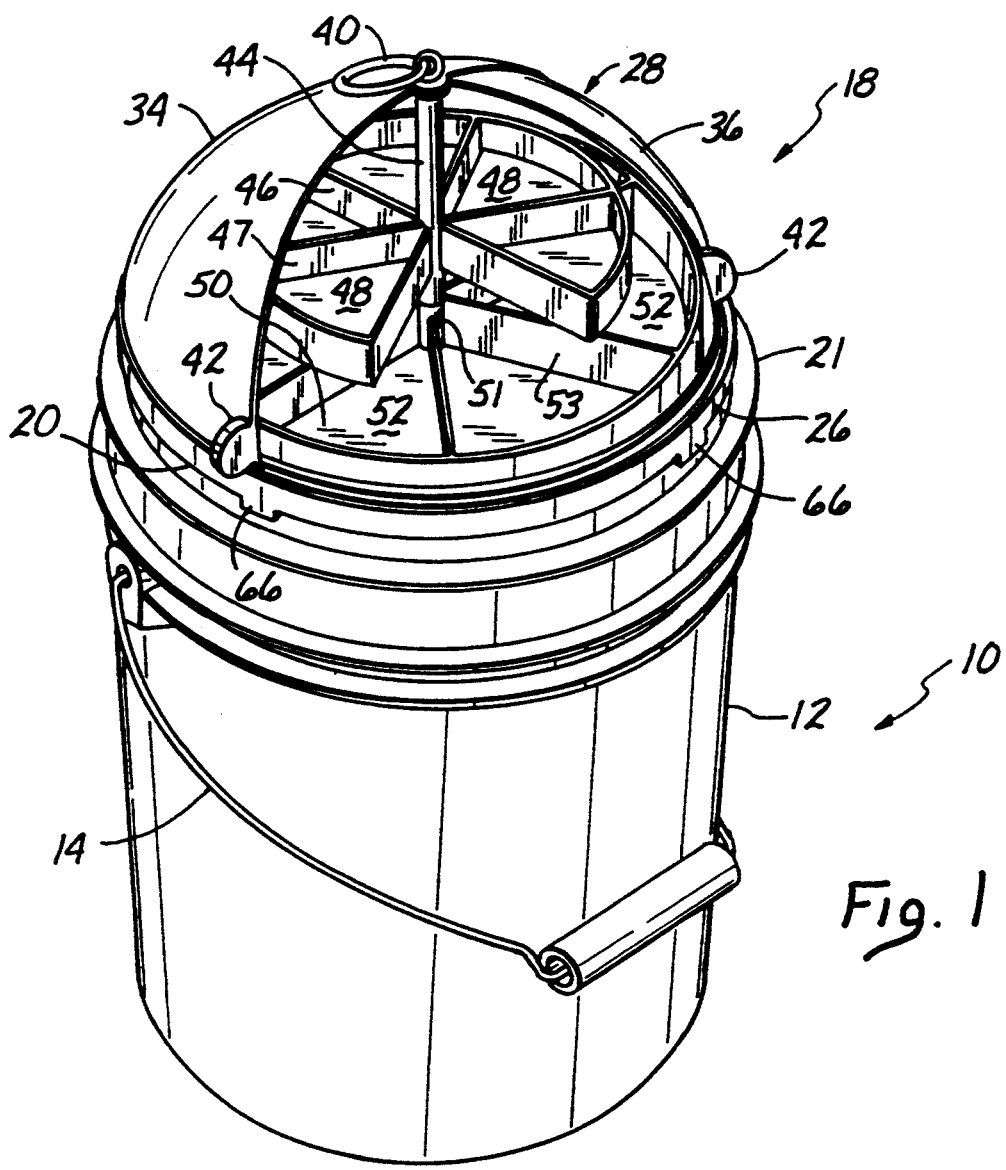
FIG. 1 is perspective view of the preferred embodiment of the present invention shown mounted within a bucket.

In accordance with the present invention, a tackle box assembly 10 is shown, reference being had initially to FIG. 1 of the accompanying drawings. The assembly 10 consists of a bucket 12, having a handle 14 connected at two diametrically opposed points on the outside of the generally cylindrically shaped bucket 12. The handle is adapted to be swung over the bucket 12 for gripping by a user's hand.

Sitting in the top opening of the bucket is the tackle box 18 of the present invention. The tackle box 18 may be better understood when viewing FIG. 1 in conjunction with FIG. 2 of the accompanying drawings, where the elements of the tackle box 18 are slightly exploded for clarity in visualizing the fit of these elements. The bucket 12 has a rim or lip 16 flanging outwardly from the top opening in the bucket 12.

A container tray, or bottom tray 20 fits within the top opening of the bucket 12. The bottom tray 20 has a rim or lip 21 adapted to seat on the lip 16 of the bucket 12, which will be explained in greater detail below. The bottom tray 20 is divided into compartments 22 by divider walls 23 formed to extend radially from the center of the tray 20.

An intermediate tray 24 having a rim or lip 26 is integrally formed with the top, outside shell or lid assembly 28, which comprises the means for covering the tackle box 18. The lid assembly 28 comprises a stationary part or portion 34 with a slidable part or portion 36. Both lid parts 34, 36 are connected to and support a center post 38 (seen only in FIG. 4). A ring 40 connects with the top of the center post 38, for engagement by the finger of a hand, for removing the tackle box 18 from the bucket 12, as will be explained in greater detail below. Fingers 42 are formed on the lid parts 34, 36 for engagement by a finger to slide the slidable part 36 interiorly of the stationary part 34, to provide access through the lid 28.

Within the tackle box 18, a tubular sleeve 44 is slipped onto center post 38 and is rotatable around the center post 38. The sleeve 44 has mounted to it or formed with it an upper tray 46. The upper tray 46 is divided by divider walls 47 formed integrally with the tray 46, to result in compartments 48.

A lower tray 50 also has a sleeve 51 which is slipped onto the post 38, the lower tray 50 being rotatably positioned beneath the upper tray 46. A washer 54 may be slipped onto the post 38 between the sleeves 44, 51 to enhance differential rotating movement between the trays 46, 51. The lower tray 50 has a plurality of compartments 52 formed within it by divider walls 53 extending radially from the center sleeve 51.

Both trays 46, 50 can be rotated about the center. The lower tray 50 can be rotated by angularly moving the tray 50. The upper tray 46 can be rotated about the center post 38 by angularly moving the upper tray 46 with the sleeve 44.

As may be better understood in FIG. 3, which is a plan view of the tackle box assembly 10 as seen in FIG. 1, the slidable part 36 of the lid 28 can be moved in both angular directions about the center post 38 in the directions of arrow 56, by pressing on the fingers 42. In this manner, the slidable part 36 can be slid around the center post 38 underneath the part 34 of the lid 28 to provide an opening access to the trays 46, 50.

The upper tray 46 can be moved angularly about the center post 38 in the directions of the arrow 57 simply by moving the tray 46 with the finger of a hand. The tray 46 has compartments 48, with a significant part of the otherwise circular tray 46 deleted. When the tray 46 is angularly rotated so as to bring the deleted portion to the opening provided by sliding the lid part 36, access can easily be had to the compartments 52 of the lower tray 50. Lower tray 50 can be angularly moved about the center post 38 in the directions of arrow 58. The lid 28 rests upon the bucket 12, with its handle 14, by having the rim or lip 21 rest upon the lip 16 of the bucket 12.

As better seen in FIG. 4, a cross-sectional elevational view taken along the line 4—4 of FIG. 3, ring 40 is connected to the center post 38, which runs substantially through the tackle box 18. The bottom of the center post extends through the sleeves 44, 51 and through intermediate tray 24 and holds intermediate tray 24 by rivet 60. Upper tray 46 is mounted to tubular sleeve 44, which is slipped over center post 38 and rotatable around the post 38. The lower tray 50 is formed to its sleeve 51, which is slipped over center post 38 as well, and can be rotated about the center of the tackle box 18 by moving the tray 50 directly. Another washer 54 is slipped onto center post 38 between the lower tray 50 and the intermediate tray 24 to enhance differential movement between the two trays 24, 50.

In FIG. 4, the slidable lid part 36 is partially slid around so that approximately half of the slidable lid part 36 is slid underneath the stationary lid part 34. The intermediate tray 24 is mounted to bottom tray 20, and the entire assembly fits within the opening of the bucket 12. The tackle box 18 through its lip or rim 21 rests upon the rim or lip 16 of the bucket 12. Handle 14 swings around and over the tackle box 18 about the handle's diametrically opposed connections to the bucket 12.

Figure 5:
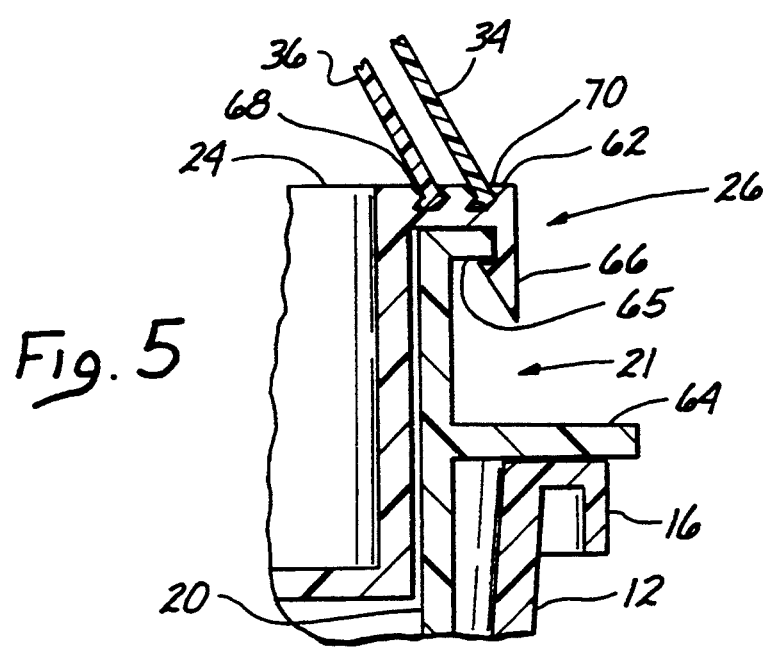

As best seen in FIG. 5, a partial cross-sectional elevation taken along the line 5—5 of FIG. 3, the bottom tray 20 is removably secured to the remainder of the tackle box 18 by latching arrangement. The stationary and slidable lid parts 34, 36 are shown in their corresponding sliding channels 68, 70. The bucket 12 supports the bottom tray 20 when the flange 64 of the lip 21 rests upon the lip 16 of the bucket 12. The lip 21 also has an upper flange 65 formed in it to support the flange 62 of the intermediate tray 24. The channels 68, 70 are shown formed in the flange 62.

The flange 62 of the lip 26 has several latches 66 spaced about the circumference of the lip 26. The material of the latch 66 is resilient, so that the latch will secure over the upper flange 65 of the lip 21. The lip 26 can be separated from the lip 21 by resiliently bending the latch 66 away from the upper lip 65 in the position seen in FIG. 5. As an alternative, resilient clamp and lever latches may be provided to secure in a removable fashion the tackle box 18 to the bucket 12.

The stationary part 34 of the lid 28 is secured within its corresponding channel 70 formed within the lip flange 62 of the rim or lip 26. A hairpin clip (not shown) may be used to further secure the center post 38 in relation to the lid 28 by inserting the clip between the ring 40 and the lid 28.

In operation, the tackle box 18 is assembled by securing the intermediate tray 24 to the bottom tray 20 by springing the latches 66 over the upper flange 65 of the lip 21. The slidable part 36 of the lid 28 is slid in its corresponding channel 68 by applying pressure to the fingers 42 so to provide a complete covering of the tackle box 18 by the lid 28 for the entire box 18. The entire tackle box 18 is then seated upon the bucket 12 by resting the lip 21 upon the lip 16 of the bucket 12. The bucket 12 is then lifted and carried by swinging the handle 14 over the semi-spherical shape of the tackle box 18.

Figure 2:
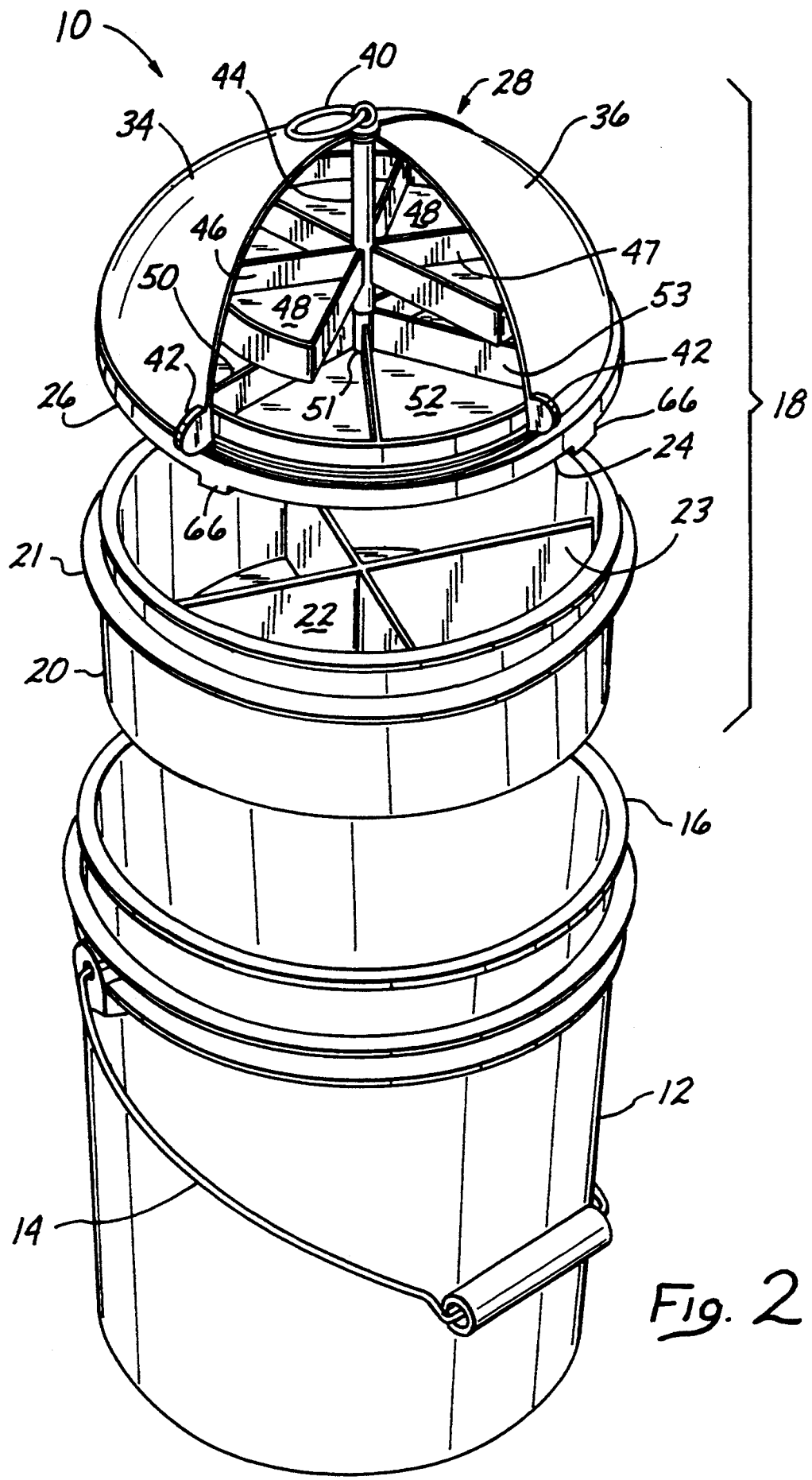
FIG. 2 is a perspective view of the preferred embodiment of FIG. 1, having parts and portions thereof exploded for clarity in understanding.

When it is desired to enter into the tackle box 18, the handle 14 is swung downwardly and away from the tackle box 18, as shown in FIGS. 1 and 2, and the lid part 36 is slid within its corresponding channel 68 by applying pressure to the fingers 42, to provide an opening to the interior of the tackle box 18. The upper tray 46 is angularly moved about the center post 38 by moving the tray 46 and its tubular sleeve 44 in the directions of arrow 57 to present the desired compartment 48 of the tray 46 to the opening provided. If access to the compartments 52 of tray 50 is desired, the tray 46 is moved so that the portion of the tray 46 having deleted compartments is positioned over the desired compartment 52 of tray 50. The lower tray 50 may be angularly moved in the directions of arrow 58, so as to present the desired compartment 52 through the deleted portions of upper tray 46 by angularly rotating the tray 50 directly.

Access to the bottom tray 20 is achieved by unlatching the intermediate tray 24 from the bottom tray 20. Unlatching is accomplished by bending the latch 66 away from the upper flange 65 of lip 21, and lifting the intermediate tray 24 by the ring 40, which is secured to the intermediate tray 24 by rivet 60. Access to the bucket 12 is achieved by lifting the tray 20 from the bucket 12. If the latches 66 secure the intermediate tray 24 to the tray 20, access to the bucket 12 is achieved by removing the entire tackle box 18 by lifting it by the ring 40 away from the bucket 12.

The foregoing detailed description of my invention and of preferred embodiments as to products, compositions and processes, is illustrative of specific embodiments only. It is to be understood, however, that additional embodiments may be perceived by those skilled in the art. For example, additional rotatable trays may be mounted so as to rotate about the center post 38. Additional trays may be provided beneath the compartmentalized trays. Alternative methods of opening the lid 28 may be provided. The embodiments described herein, together with those additional embodiments, are considered to be within the scope of the present invention, which is to be limited solely by the following claims.

I claim:

1. A tackle box adapted for mounting in a portable container having a generally horizontal opening when said container is in an upright position, comprising in combination:
   a. an axle and a mounting means comprising a generally circular rim connected to said axle
   b. an upper tray assembly comprising a first upper circular tray defining a complete circular periphery rotatably mounted on said axle, and a generally circular second upper tray having at least one compartment therein rotatably mounted on said axle above said first upper circular tray and having a significant part thereof deleted to expose at least portions of said first tray upper to vertical access through said second tray, for receiving implements and for moving said implements to an accessible position; and,
   c. covering means connected to said upper tray means and said mounting means, for selectively covering said upper tray assembly, comprising a generally semispherical lid means for opening and closing said covering means comprising a first half of a generally semispherical shell rotatably mounted to said axle and a second half of a generally semispherical shell connected to said axle and positioned to receive said first half of the generally semispherical shell when said second shell is rotated about said axle to expose portions of said first and said second upper trays to accessible positions.

2. The tackle box of claim 1 further comprising a lower tray means for receiving implements, said lower tray assembly being adapted to be selectively connected to said horizontal opening and to said mounting means, comprising a generally circular tray having a circular periphery defining a lip adapted to fit to said horizontal opening of said portable container and to receive said mounting means.

3. The tackle box of claim 1 wherein said first upper tray comprises a plurality of said tray compartments.

4. The tackle box of claim 3 wherein said compartments of said first tray are defined by divider walls extending from said axle to said circular periphery.

5. The tackle box of claim 1 further comprising lift means connecting all elements of said tackle box for removing said tackle box from said horizontal opening of said portable container and for holding said tackle box.

6. The tackle box of claim 2 wherein said mounting means further comprises latching means for securing said upper tray assembly to said lower tray assembly.

* * * * *